Sept. 23, 1969  P. MARCUS  3,468,443
BASE OF PLASTIC CONTAINER FOR STORING FLUIDS UNDER PRESSURE
Filed Oct. 6, 1967  2 Sheets-Sheet 1

INVENTOR.
PAUL MARCUS
BY
Brumbaugh, Free, Graves & Donohue
his ATTORNEYS

Sept. 23, 1969 P. MARCUS 3,468,443
BASE OF PLASTIC CONTAINER FOR STORING FLUIDS UNDER PRESSURE
Filed Oct. 6, 1967 2 Sheets-Sheet 2

INVENTOR.
PAUL MARCUS
by Brumbaugh, Free, Graves & Donohue
his ATTORNEYS

United States Patent Office 3,468,443
Patented Sept. 23, 1969

3,468,443
BASE OF PLASTIC CONTAINER FOR STORING FLUIDS UNDER PRESSURE
Paul Marcus, Pearl River, N.Y., assignor to APL Corporation, Brooklyn, N.Y., a corporation of New York
Filed Oct. 6, 1967, Ser. No. 673,450
Int. Cl. B65d 23/00
U.S. Cl. 215—1                                            8 Claims

ABSTRACT OF THE DISCLOSURE

A base for a disposable bottle formed of relatively flexible plastic material for storing beverages and the like under pressure has a bottom web at least in part generally concave as viewed from outside the bottle. The bottom web is formed with ribs to rigidify it so that outward flexing of the bottom web under pressure is reduced. The tendency of the beverage to cause a rocker condition is thus overcome, notwithstanding the flexibility of the plastic material.

BACKGROUND OF THE INVENTION

This invention relates to a base for disposable bottles formed of relatively flexible plastic material for storing beverages and the like under pressure and, more particularly, to a novel and highly-effective bottle base formed with rigidifying ribs and adapted to withstand considerable internal pressure without assuming a "rocker" configuration.

Plastic bottles have not heretofore found commercial acceptance for the bottling and storing of beverages and the like under pressure. One of the main problems associated with the use of plastic bottles for such a purpose has been the tendency of the center of the bottom to deflect outwardly beyond the rim or heel of the bottom, thus causing a rocker condition.

Attempts have been made in the past to remedy the problem, but the prior-art structures have either been too flexible to prevent unacceptable bulging of the bottom or have been unacceptably thick or costly to manufacture.

SUMMARY OF THE INVENTION

An object of the present invention is to remedy the shortcomings in the prior-art structures pointed out above. In particular, an object of the invention is to provide a base for a disposable bottle formed of relatively flexible plastic material for storing beverages and the like under pressure having a bottom web so constructed as to overcome the tendency of a pressurized beverage stored in the bottle to cause a rocker condition and at the same time more economical to manufacture than conventional disposable glass bottles.

The foregoing and other objects of the invention are attained, in a representative base for a disposable bottle formed of relatively flexible plastic material for storing beverages and the like under pressure, by the combination of an annular heel integral with the sidewall of the bottle and a bottom web surrounded by an integral with the heel. The heel is generally convex and the web at least in part generally concave as viewed from outside the bottle, the web being formed with ribs to rigidify it. The ribs are generally convex as viewed from outside the bottle and are symmetrically spaced about the center of the web. The ribs extend from the heel substantially to the center of the bottom web to reduce outward flexing of the web under pressure, whereby the bottle when placed on a flat surface in an upright position is stably supported in the vicinity of the heel, the center of the web being spaced apart from the surfaces. In this manner, the tendency of the beverage to cause a rocker condition is overcome notwithstanding the flexibility of the plastic material.

BRIEF DESCRIPTION OF THE DRAWING

An understanding of additional aspects of the invention may be gained from a consideration of the following detailed description of a number of representative embodiments of the invention, taken in conjunction with the accompanying figures in the drawing, in which.

DESCRIPTION OF THE PREFERRED EMBODIMENTS

In each of FIGS. 1–12, the bottle base constructed in accordance with the invention is shown in an inverted position, as it would be viewed if held in the hand for visual inspection.

Figure 1:
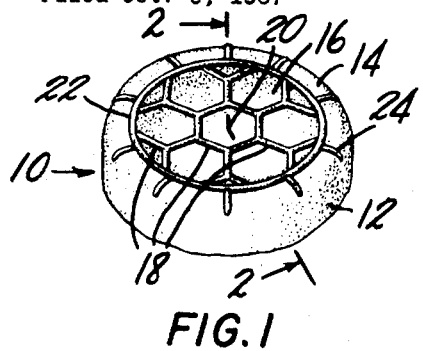
FIG. 1 is a perspective view of a first embodiment of a bottle base constructed in accordance with the invention.

FIG. 1 shows a first embodiment of a bottle base 10 constructed in accordance with the invention. FIG. 1 and the other figures are fragmentary, indicating that the bottle base 10 is integral with and a continuation of a sidewall 12 of the bottle. The remainder of the bottle need not be shown, inasmuch as it constitutes no part of the present invention and may be of any shape suitable for the purpose for which the bottle is intended.

Figure 2:
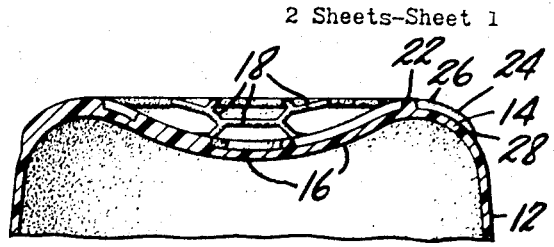
FIG. 2 is a sectional view taken generally along the line 2—2 in FIG. 1 and looking in the direction of the arrows.

The base includes a rim or heel portion 14 integral with the sidewall 12 and a bottom web 16 surrounded by and integral with the heel 14. The heel 14 is generally convex and the web 16 at least in part generally concave as viewed from outside the bottle. FIG. 2 well illustrates the convexity of the heel 14 and the concavity of the web 16 as viewed from outside the bottle.

In accordance with the invention, the web 16 is formed with ribs 18 to rigidify it. While the overall pattern of the ribs 18 is generally concave as viewed from outside the bottle, the individual ribs 18 considered per se are generally convex as viewed from outside the bottle.

The ribs 18 are symmetrically spaced about the center 20 of the web 16 and collectively extend from the heel 14 substantially to the center 20.

In the embodiment of FIG. 1, the ribs 18 define a plurality of regular polygons and, more particularly, a plurality of regular hexagons. Other shapes such as equilateral triangles (not shown) may also be used.

In the embodiment of FIGS. 1 and 2, an annular rib 22 is formed at the junction of the web 16 and heel 14. In addition, the heel 14 is formed with a plurality of ribs 24 having inner ends 26 radially oriented with respect to the center 20 and outer ends 28 curving into the sidewall 12 of the bottle.

The ribs reduce outward flexing of the bottom web 16 under pressure, so that, when the bottle is placed on a flat surface in an upright position, it is stably supported in the vicinity of the heel. By virtue of the concavity of the web 16 referred to above, the center 20 of the web is spaced apart from the supporting surface.

Modifications of the structure of FIGS. 1 and 2 will readily occur to those skilled in the art in the light of the previous disclosure. For example, the ribs 24 can be replaced by grooves. Either configuration contributes to the requisite rigidity of the structure notwithstanding the use of a relatively flexible material.

Figure 3:
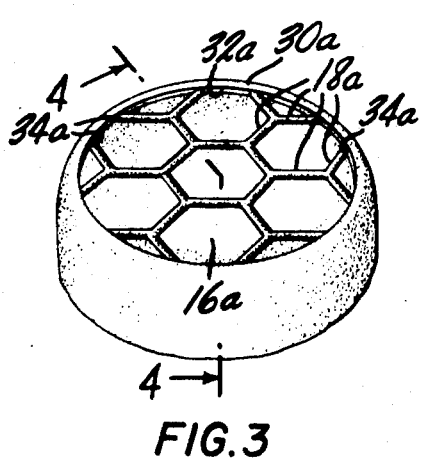
FIG. 3 is a perspective view of a second embodiment of a bottle base constructed in accordance with the invention.
Figure 4:
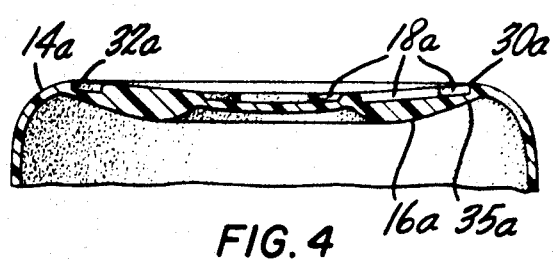
FIG. 4 is a sectional view taken generally along the line 4—4 of FIG. 3 and looking in the direction of the arrows.

The embodiment of FIGS. 3 and 4 is similar to the embodiment of FIGS. 1 and 2 but differs therefrom in several respects. In the embodiment of FIGS. 3 and 4, the ribs 22 and 24 are omitted, and the ribs 18a join the heel 14a at a portion or rib 30a thereof defining the inner annular boundary of the heel 14a. The portion 30a is formed with a shoulder 32a which the outer ends 34a of the outermost ribs 18a abut. In this embodiment, the degree of concavity of the web 16a is less than the degree of concavity of the web 16, as a comparison of FIGS. 2 and 4 reveals. In the embodiment of FIGS. 3 and 4, on the other hand, the web 16a is recessed at its junction 35a with the portion 30a of the heel 14a.

Figure 5:
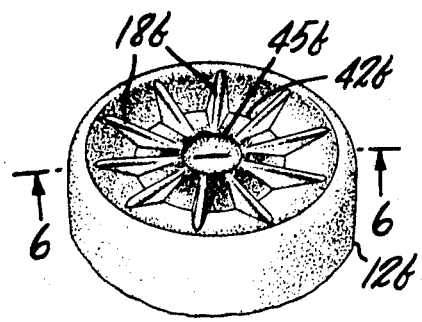
FIG. 5 is a perspective view of a third embodiment of a bottle base constructed in accordance with the invention.
Figure 6:
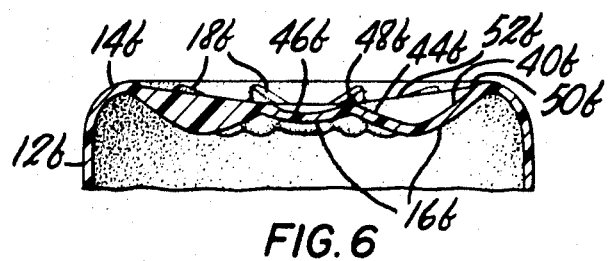
FIG. 6 is a view taken generally along the line 6—6 of FIG. 5 and looking in the direction of the arrows.

Another embodiment of the invention is shown in FIGS. 5 and 6. The sidewall 12b curves smoothly into the heel 14b, and a radially-outer portion 40b of the web 16b extends (downwardly in the inverted position shown in the figures of the drawing or upwardly when the bottle is in an upright position) at an angle of about 40 degrees with respect to the plane (defined for present purposes as a "horizontal" plane) of the heel 14b that supports the bottle when the bottle is placed in an upright position on a flat surface. This portion 40b of the web 16b terminates at a circle 42b where it joins a radially-inner portion 44b of the web 16b having a reverse slope of about 20 degrees with respect to the horizontal plane and terminating in a circle 45b spaced apart from the horizontal plane about half as far as the circle 42b.

The web 16b contains a further depression 46b at the center thereof.

A plurality of webs 18b, radially oriented in the embodiment illustrated, tie the heel and center portions of the web 16b together to rigidify the web and, by virtue of their contact with the web 16b along the portions 40b and 44b thereof, preserve the angular relationships described above. The radially-inner ends 48b of the ribs 18b are spaced apart from the horizontal plane referred to above a distance substantially equal to the separation between the circle 45b and the plane. The radially-outer ends 50b of the ribs 18b are spaced apart from the same plane about one quarter as far as the separation between the circle 45b and the plane. Thus, the slope of the edges 52b of the ribs 18b is significantly less than the slope of the portion 40b of the web 16b, but the configuration of the ribs 18b considered as a whole remains concave as viewed from outside the bottle.

Figure 7:
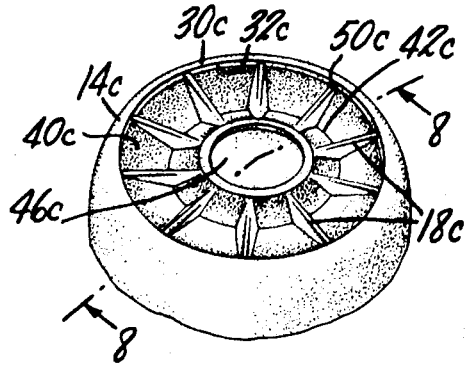
FIG. 7 is a perspective view of a fourth embodiment of a bottle base constructed in accordance with the invention.
Figure 8:
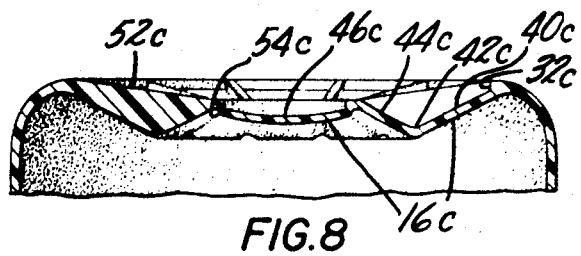
FIG. 8 is a sectional view taken along the line 8—8 of FIG. 7 and looking in the direction of the arrows.

The embodiment of the invention illustrated in FIGS. 7 and 8 is similar to the embodiment illustrated in FIGS. 5 and 6 but differs therefrom in several respects.

In the embodiment of FIGS. 7 and 8, the heel 14c terminates in an annular rib or portion 30c defining an annular shoulder 32c which the radially outer ends 50c of ribs 18c abut. Similarly, the center 46c has a raised border 54c and is larger than the center 46b of the embodiment of FIGS. 5 and 6.

In addition, the intersection of the portions 40c and 44c of the web 16c at a circle 42c is more angular in the embodiment of FIGS. 7 and 8 than the corresponding structure in the embodiment of FIGS. 5 and 6.

The embodiments of FIGS. 5 and 6 on the one hand and FIGS. 7 and 8 on the other are similar in the significant respect that the edges 52b and 52c are all straight.

Figure 9:
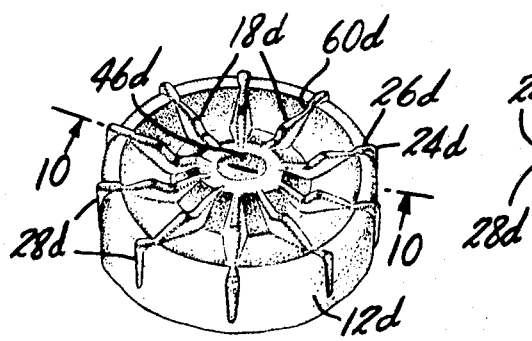
FIG. 9 is a perspective view of a fifth embodiment of a bottle base constructed in accordance with the invention.
Figure 10:
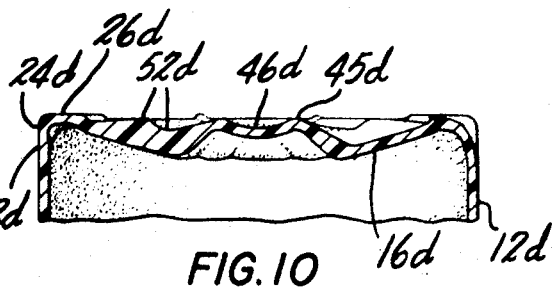
FIG. 10 is a sectional view taken generally along the line 10—10 of FIG. 9 and looking in the direction of the arrows.

FIGS. 9 and 10 illustrate an embodiment of the invention in which the edges 52d of the ribs 18d are curved in a "vertical" plane (the vertical plane being defined as a plane normal to the horizontal plane referred to above).

Ribs 24d have radially-inner ends 26d oriented generally radially with respect to the center of the base and radially outer ends 28d extending along the sidewall 12d of the bottle. The ribs 24d are contiguous with the ribs 18d, there being a depression 60d at their junction.

The degree of concavity of the bottom web 16d is less than the degree of concavity of the webs 16b and 16c. However, the circle 45d is nevertheless spaced apart from the plane defined by the supporting surfaces of the ribs 24d. Thus, a rocker condition is not produced, and the bottle is stably supported by a flat supporting surface.

Figure 11:
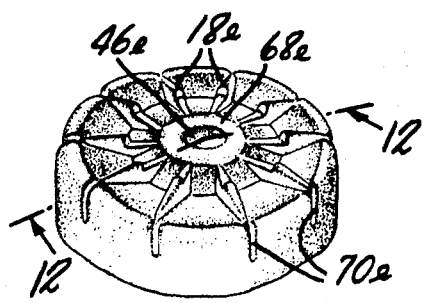
FIG. 11 is a perspective view of a sixth embodiment of a bottle base constructed in accordance with the invention.
Figure 12:
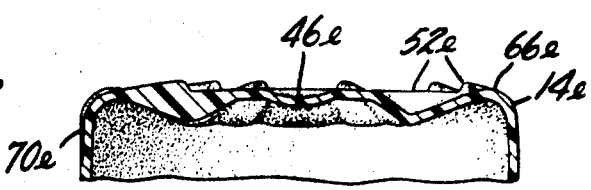
FIG. 12 is a sectional view taken generally along the line 12—12 of FIG. 11 and looking in the direction of the arrows.

The embodiment of FIGS. 11 and 12 is similar to the embodiments of FIGS. 9 and 10 in that the edges 52e of the ribs 18e are curved in a vertical plane. On the other hand, the supporting surfaces of the ribs 18e are radially inward of the portion 66e of the heel 14e closest to the horizontal supporting plane. The supporting surfaces of the ribs 18e are nevertheless in the vicinity of the heel 14e so that the bottle is stably supported by a flat surface.

The embodiment of FIGS. 11 and 12 differs from that of FIGS. 9 and 10 in that in the vicinity of the center is a flat portion 68e of annular shape surrounding the center depression 46e.

In addition, grooves 70e replace the portions of the ribs 28d extending along the sidewall of the bottle.

Thus there is provided in accordance with the invention a novel and highly effective base for a disposable plastic bottle. The structural design of the bottle bases is such as to withstand the elevated liquid and gas pressures found in bottles containing carbonated beverages such as beer and soda. The design is well adapted to withstand the pressure load and, in particular, to prevent the bottom center from deflecting beyond the bottom rim and causing a rocker condition. The bottle is adapted to be made by conventional injection and injection-blow molding apparatus and methods and is significantly cheaper than the disposable glass bottles known in the prior art.

Those skilled in the art will understand that many modifications of the embodiments disclosed above are possible within the spirit and scope of the invention.

Accordingly, the invention is to be construed as extending to all of the modifications thereof covered by the appended claims, in which elevation is to be considered determined with the bottle base of the invention in an upright position.

I claim:

1. A base for a disposable bottle formed of relatively flexible plastic material for storing beverages and the like under pressure comprising the combination of an annular heel integral with the sidewall of the bottle and a bottom web surrounded by and integral with said heel, the heel being generally convex and the web at least in part generally concave as viewed from outside the bottle, the web being formed with ribs to rigidify it, said ribs being generally convex as viewed from outside the bottle, being symmetrically spaced about the center of said web, and extending from said heel substantially to said center to reduce outward flexing of said web under pressure, said web containing a further depression at the center thereof, whereby said bottle when placed on a flat surface in an upright position is stably supported in the vicinity of said heel, the center of the web being spaced apart from the surface, and the tendency of said beverage to cause a rocker condition is overcome notwithstanding the flexibility of said plastic material.

2. A bottle base as set forth in claim 1 in which said ribs are radially oriented with respect to said center and have radially inner ends and radially outer ends, the inner ends being at a higher elevation than the outer ends.

3. A bottle base as set forth in claim 1 in which said ribs are radially oriented with respect to said center and have lower edges curved in a vertical plane.

4. A base for a disposable bottle formed of relatively flexible plastic material for storing beverages and the like under pressure comprising the combination of an annular heel integral with the sidewall of the bottle and a bottom web surrounded by and integral with said heel, the heel being generally convex and the web at least in part generally concave as viewed from outside the bottle, the web being formed with ribs to rigidify it, said ribs being generally convex as viewed from outside the bottle, being symmetrically spaced about the center of the web and defining a plurality of regular polygons, and extending from said heel substantially to said center to reduce outward flexing of said web under pressure, whereby said bottle is stably supported in the vicinity of said heel, the center of the web being spaced apart from the surface, and the tendency of said beverage to cause a rocker condition is overcome notwithstanding the flexibility of said plastic material.

5. A bottle base as set forth in claim 2 in which said polygons are hexagons.

6. A bottle base as set forth in claim 2 further comprising a plurality of ribs formed in said heel portion, said ribs having inner ends radially oriented with respect to said center and outer ends curving into the sidewall of the bottle.

7. A base for a disposable bottle formed of relatively flexible plastic material for storing beverages and the like under pressure comprising the combination of an annular heel integral with the sidewall of the bottle and a bottom web surrounded by and integral with said heel, the heel being generally convex and the web at least in part generally concave as viewed from outside the bottle, the web being formed with ribs to rigidify it, said ribs being generally convex as viewed from outside the bottle, symmetrically spaced about the center of said web, and radially oriented with respect to said center, extending from said heel substantially to said center to reduce outward flexing of said web under pressure, and having lower edges curved in a vertical plane, whereby said bottle when placed on a flat surface in an upright position is stably supported in the vicinity of said heel, the center of the web being spaced apart from the surface, and the tendency of said beverage to cause a rocker condition is overcome notwithstanding the flexibility of the plastic material, further comprising a plurality of ribs formed on said heel portion, said ribs having inner ends radially oriented with respect to said center and outer ends extending into the sidewall of the bottle.

8. A base for a disposable bottle formed of relatively flexible plastic material for storing beverages and the like under pressure comprising the combination of an annular heel integral with the sidewall of the bottle and a bottom web surrounded by and integral with said heel, the heel being generally convex and the web at least in part generally concave as viewed from outside the bottle, the web being formed with ribs to rigidify it, said ribs being generally convex as viewed from outside the bottle, symmetrically spaced about the center of said web, and radially oriented with respect to said center, extending from said heel substantially to said center to reduce outward flexing of said web under pressure, and having lower edges curved in a vertical plane, whereby said bottle when placed on a flat surface in an upright position is stably supported in the vicinity of said heel, the center of the web being spaced apart from the surface, and the tendency of said beverage to cause a rocker condition is overcome notwithstanding the flexibility of the plastic material, further comprising a plurality of grooves formed in said heel portion, said grooves having inner ends radially oriented with respect to said center and outer ends extending into the sidewall of the bottle.

References Cited

UNITED STATES PATENTS

| 3,029,963 | 4/1962 | Evers | 215—1 |
| 3,043,461 | 7/1962 | Glassco | 215—1 |

DONALD F. NORTON, Primary Examiner

U.S. Cl. X.R.

150—.5

PO-1050
(5/69)

UNITED STATES PATENT OFFICE
CERTIFICATE OF CORRECTION

Patent No. 3,468,443          Dated  Sept. 23, 1969

Inventor(s)          Paul Marcus

It is certified that error appears in the above-identified patent and that said Letters Patent are hereby corrected as shown below:

Col. 5, line 28, "2" should be --4--; and

Col. 5, line 30, "2" should be --4--.

SIGNED AND
SEALED

DEC 23 1969

(SEAL)
Attest:

Edward M. Fletcher, Jr.
Attesting Officer

WILLIAM E. SCHUYLER, JR.
Commissioner of Patents